United States Patent [19]

Handlin, Jr.

[11] Patent Number: 4,798,853
[45] Date of Patent: Jan. 17, 1989

[54] KRATON G THERMOPLASTIC ELASTOMER GEL FILLING COMPOSITION FOR CABLES

[75] Inventor: Dale L. Handlin, Jr., Houston, Tex.

[73] Assignee: Shell Oil Company, Houston, Tex.

[21] Appl. No.: 6,287

[22] Filed: Jan. 20, 1987

Related U.S. Application Data

[63] Continuation of Ser. No. 687,066, Dec. 28, 1984, abandoned.

[51] Int. Cl.$^4$ .............................................. H02G 15/00
[52] U.S. Cl. ..................................... 523/173; 524/474
[58] Field of Search ......................... 523/173; 524/474

[56] References Cited

U.S. PATENT DOCUMENTS

| | | | |
|---|---|---|---|
| 3,607,487 | 9/1971 | Biskeborn et al. | 156/47 |
| 3,717,716 | 2/1973 | Biskeborn et al. | 174/24 |
| 3,775,548 | 11/1973 | Zinser, Jr. et al. | 174/23 |
| 3,879,575 | 4/1975 | Dobbin et al. | 174/92 |
| 3,893,962 | 7/1975 | Walton et al. | 524/491 |
| 4,259,540 | 3/1981 | Sabia | 174/23 |
| 4,351,913 | 9/1982 | Patel | 523/173 |
| 4,361,507 | 11/1982 | Bourland | 523/173 |
| 4,361,508 | 11/1982 | Bourland | 523/173 |
| 4,464,013 | 8/1984 | Sabia | 524/474 |
| 4,509,821 | 4/1985 | Stenger | 523/173 |
| 4,701,016 | 10/1987 | Gartside, III et al. | 523/173 |

Primary Examiner—Joseph L. Schofer
Assistant Examiner—J. M. Reddick

[57] ABSTRACT

A fast forming, thermally reversible gel for filling cables at selective, specific gel temperatures which comprises a styrene-ethylene-butene-styrene block copolymer and a naphthenic or paraffinc oil or solvent with an oil aromatic content up to 25% by weight.

4 Claims, 1 Drawing Sheet

KRATON G THERMOPLASTIC ELASTOMER GEL FILLING COMPOSITION FOR CABLES

This is a continuation of application Ser. No. 687,066, filed Dec. 28, 1984, now abandoned.

BACKGROUND OF THE INVENTION

Cables for power, electronic (telephone) transmission, hydrophone cables for oil exploration at sea and other various uses have been filled with various substances in order to protect against water intrusion since 1970. Intrusion occurs when water penetrates into a localized opening in a cable sheath and is free to channel as far as physical processes for water spread and transport allow, often hundreds of feet. Not only does this upset capacitance balance of the transmission cable line but it introduces more potential corrosion sites in proproportion to the length of wire that is wetted. The useful life of water-soaked wires is obviously shorter than that of dry wires.

The solution that has been widely adopted is to fill the voids in the cable with a water insoluble filling material that simply encapsulates the cable components to prevent water intrusion. The filling fluid serves four purposes: (1) it provides a sonic couple of the hydrophone with the jacket; (2) it protects the electrical wiring from corrosive salt water; (3) it protects the environment from oil spills, and (4) it protects a vessel crew from the dangers associated with handling harsh solvents and oils. However, although this physical function of the cable filling material is straight-forward, the choice of the material is not. Among the many considerations that are important for materials used in this application are the hydrophobic nature of the material, low temperature properties, flow characteristics at elevated temperatures, the highest temperature at which the encapsulant may be used ("upper service temperature"), processing characteristics, handling characteristics, dielectric properties, toxicity and cost. In addition, it is desired that the material have the capacity to control the gellation or gel dissolution temperature by changing the character of the gel. This is so that a specific gel dissolution temperature may be selected.

Materials that satisfy most of these criteria and which have been widely used are described in U.S. Pat. Nos. 3,607,487, 3,717,716 issued Sept. 21, 1971 and Feb. 20, 1973 respectively and U.S. Pat. No. 3,775,548. These materials are essentially a petroleum jelly, mixed with a polymer, usually polyethylene, to impart consistency and prevent flowing at warm temperatures below the upper service temperature.

Similar hydrophobic encapsulants have been proposed for filling splice closures. For example, U.S. Pat. No. 3,879,575 issued Apr. 22, 1975 describes a mixture of a low viscosity oil gelled by a styrene-isoprene-styrene copolymer, again with polyethylene added. The polyethylene is used to obtain a high use temperature needed for use with power transmission cables which reach high temperatures. U.S. Pat. No. 4,259,540 discloses the use of a styrene-ethylene butylene-styrene block copolymer, polyethylene, and a paraffinic or napthenic oil, where the oil has a maximum of 5% aromatic oils, in order to enable the cable encapsulant to meet the functional requirements of the cable, i.e., high temperature resistance and to provide good handling characteristics that petroleum jelly material does not possess.

However, all of these above-described encapsulants have a predetermined gel dissolution temperature which cannot be selectively controlled. Control of the gellation (i.e., dissolution) temperature, as well as maintenance of the other necessary and desirable factors discussed, is thus highly desirable; however; heretofore there has not been found an encapsulating material with the necessary advantages, which is also highly selective with regard to the gellation temperature desired. For example, one might wish a gel dissolution temperature to be fairly high so that the gel would form fast upon filling and allow the cable to be used quickly. Or, one might desire a gel which forms at a low temperature so that it would be slower forming. In addition, in none of these previously used materials in the above-described patents may the density be selectively controlled for the amount of buoyancy desired, while still retaining gellation temperature control, etc.

In addition, an encapsulant which is thermally reversible has long been sought. This means that the encapsulant may be removed and replaced during maintenance time and time again at a temperature below the temperature that would damage the cables. An encapsulant which is thermally reversible can be heated to a liquid and then cooled to a gel over and over again without damage to the nature of the filling material, or cable components. This is especially true in hydrophone cables that are generally not permanently installed but towed at sea where the utility of such invention is paramount.

SUMMARY OF THE INVENTION

This invention includes a fast forming, thermally reversible gel so that it may be heated to a liquid and cooled to a gel over and over again at a temperature above the use temperature where the gel may be removed and replaced during maintenance. The gellation or gel dissolution temperature may be specifically controlled in order to change the character of the gel. This may be done by the concentration of polymer in either solvent and/or oil, the aromatic content of oil or solvent, and the molecular weight of KRATON ® G thermoplastic elastomer.

In addition, this gel may be formulated so as to be selective for desired degree of buoyancy of the cable.

The gel is based on light hydrocarbon process oils or solvents and styrene-ethylene-butylene-styrene block copolymers. The filling material (KRATON G thermoplastic elastomer, available from Shell Oil, Houston, Tex.) or gel encapsulating compound, comprises from about 2 percent by weight to about 15 percent by weight styrene-ethylene-butylene-styrene block copolymers and from about 85 percent by weight to about 98 percent by weight of a naphthenic or paraffinic oil or solvent with an aromatic content of up to 25 percent by weight. The encapsulating compound is preferably about 5% by weight of the S-EB-S block copolymer, and preferably about 95 percent by weight of a naphthenic or paraffinic oil or solvent with an aromatic content of preferably about 15 percent by weight.

This invention also includes a cable or other conduit requiring water protection which contains the encapsulating compound described above.

DETAILED DESCRIPTION OF THE INVENTION

Figure 1:
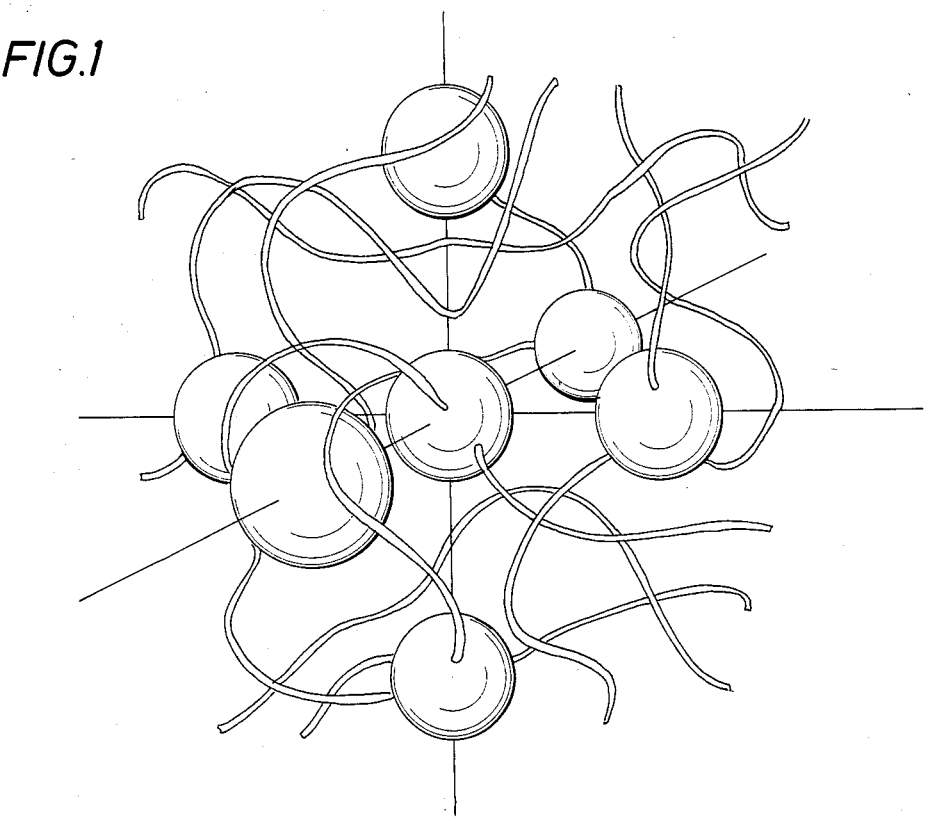
FIG. 1 is a drawing of the triblock network structure of the S-EB-S block copolymer.

The encapsulating compound or gel of the present invention has the following properties:

(1) Above the gel temperature the material is a clear, low viscosity fluid;

(2) Below the gel temperature, the material is a non-conductive, clear rubber gel with measurable tensile strength.

(3) The gel is thermally reversible at a temperature below the temperature that will damage the cables so that the gel may be removed and replaced during maintenance.

(4) The gel dissolution temperature may be controlled precisely by the polymer concentration or by the aromatic content of the solvent or oil to temperatures from 10° C. to above 100° C.

(5) The gel is hydrophobic and protects the cable from water leakage.

(6) The gel's hardness and strength increases gradually at temperatures increasingly below the gel temperature.

(7) The specific gravity of the gel can be between 0.76 and 0.90 depending on the solvent, to provide desired buoyancy.

(8) The gel provides as good a sonic couple as the cable fluids in general use.

The gel is based on light hydrocarbon process oils and/or solvents and styrene-ethylene-butylene-styrene block copolymers. Because of the temperature dependence of their compatibility with the paraffinic oils, and solvents, the S-EB-S block polymers' styrene domains dissolve in the oils or solvents above the gel dissolution temperature. Once dissolved, these styrene blocks exhibit fast phase separation and gel network formation from solution as the temperature is lowered.

The gel dissolution temperature is a function of (1) the concentration of polymer in either solvent and/or oil, (2) the aromatic content of oil or solvent being less than 25% by weight, and (3) the molecular weight of Kraton thermoplastic elastomer. It should be noted that with oils containing >20% aromatics concentration one may need to cool the solution to below room temperature to reach the gel dissolution temperature.

EXAMPLE 1

Kraton G 1652 rubber was dissolved in Sunpar® 120LW, available from Sun Oil Co., at 80° C. so that the solution contained 4 percent S-EB-S block copolymer. As the solution temperature was lowered the viscosity began to rise sharply at about 62° C. and the solution gelled immediately upon reaching 60° C. The gel had a dissolution temperature of 60° C.

EXAMPLE 2

Kraton G 1652 rubber was dissolved in Shellflex® 131, which may be obtained from Shell Oil Co., Houston, Tex., oil at 30° C. so that the solution contained 4 percent S-EB-S block copolymer. The solution gelled upon cooling at 15° C.

EXAMPLE 3

A clear gel was formed in Norpar® 13 solvent, available from Exxon, Houston, Tex., by adding 4% Kraton G 1652 rubber and allowing the mixture to stand at 20° C. for two hours. Upon heating to 29° C. the gel dissolved to a low viscosity fluid. Upon cooling, the solution gelled at 29° C. Also, 4% Kraton G 1650 was added to Norpar-13, with a resulting gel temperature of 38° C. Likewise, 4% Kraton G 1651 was added to Norpar-13, with a resulting temperature of greater than 100° C. The same gel could be formed by dissolving above the gel temperature as in Example 1.

EXAMPLE 4

A gel was made by mixing 33% Sunpar 120LW oil at 40° C. with 66% by weight of a solution of 6% by weight Kraton G 1652 dissolved in Shellflex 131 oil which has a gel dissolution temperature below room temperature (18° C.) so that it could be prepared by stirring at room temperature. The resultant solution gelled at 30° C. upon cooling.

EXAMPLE 5

The ethylenic comonomer containing the S-EB-S gel of Example 2 is filled into a suitable cable before cooling from the solution. The cable is ready for use immediately after filling.

EXAMPLE 6

The gel may also be selectively made to achieve the amount of buoyancy desired in the cable when used in aqueous environments. For example, maximum cable buoyancy was achieved by dissolving 6% by weight Kraton G 1650 rubber in NORPAR #13. The gel resulted in a specific gravity of 0.78 and a gel temperature of 42° C.

EXAMPLE 7

Minimum buoyancy was achieved by dissolving 4% Kraton G 1652 rubber in a 50/50 by weight blend of SUNPAR 120LW oil and SHELLFLEX 131 oil. The gel resulted in a specific gravity of 0.88 and a gel temperature of 37° C.

It is thought that many hydrocarbon fluids above the molecular weight of 150 will be gelled by S-EB-S block copolymers. For example, Isopar® M, available from Exxon, Houston, Tex., which has an average molecular weight of 191, has been used. Shellflex 371, which has an average molecular weight of 400, is also suitable for gel formation. For example, Shellflex 210 oil has been used which has a 16 percent aromatic content. Shellflex 131, may also be used as a suitable oil which contains about 24 percent aromatic content as well as Sunpar 120 LW, which contains less than 5 percent aromatic content.

The S-EB-S block copolymer dissolves in the oils easily especially at elevated temperature. The S-EB-S block copolymer dissolves in lower molecular weight solvents to form a gel at room temperature in a period of several hours. The gel may be homogenized by heating above the gel dissolution temperature prior to filling. Because the polymer is low molecular weight, it increases the viscosity of the solvent only slightly above the gel temperature. Concentrations of S-EB-S block copolymer may be from about 2% by weight to about 15% by weight, but preferably about 6% by weight. Gels have been made with Kraton G 1650, 1651, and 1652 thermoplastic elastomer, which range from about 50,000 to about 200,000 molecular weight of the entire Kraton G molecule with 30% by weight styrene.

Paraffinic solvents include Shell Sol® 71, available from Shell Oil, Houston, Tex., and Isopar M and Nopar

13. Paraffinic oils may also be used including Shellflex® 210 (HVI 100N), Shellflex® 371 (HVI 400N) (both available from Shell Oil Co., Houston, Tex.), and Sunpar 120LW/ Shellflex 131 blends. In order to from a gel at polymer concentrations of less than 10%, the oil or solvent must contain less than 25% aromatics.

The Kraton G 1652 rubber may be dissolved in the oil at the cable filling site at a temperature above the gel dissolution temperature, or dissolved earlier and the gel handled in drums, or made in two parts, one consisting of a solution of S-EB-S rubber dissolved in a more aromatic oil so that it has a gel dissolution temperature below room temperature and the other part being a lower aromatic content oil so that when the two parts are mixed a gel is formed.

Applicant's invention encompasses a fast forming gel material which is thermally reversible so that if the cable is later punctured and the gel material must be released and/or refilled into the cable, it may be heated to solution and cooled to the filling temperature over and over again without any loss of the gel materials' desirable filling characteristics.

FIG. 1 shows the triblock network structure of the styrene-ethylene-butene-styrene block copolymer. The styrene domains are spherical. The solvent is the ethylene-butene molecules (rubber block). Upon reaching the gel dissolution temperature, the spherical styrene domains are dissolved and the gel becomes a liquid. Prior to dissolution of the styrene domains, the material is a gel.

Figure 2:
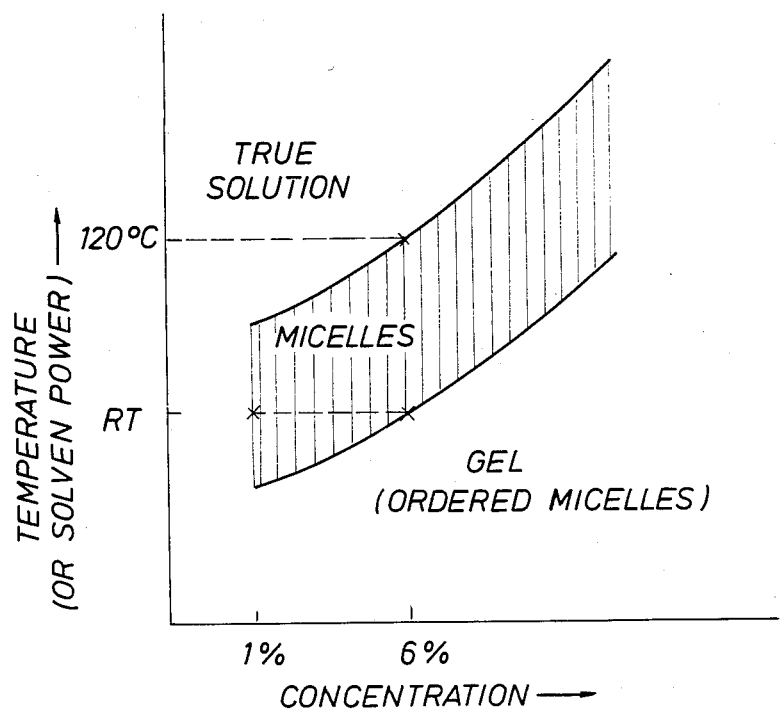
FIG. 2 is a graph of the conceptual behavior of the S-EB-S block copolymers in solvent.

FIG. 2 is a graph of the conceptual behavior of the S-EB-S block copolymers in solvent. As the temperature increases, the S-EB-S block copolymers approach a more true solution. As the temperature decreases, the S-EB-S block copolymers approach a gel.

Various additional modifications and extensions of this invention such as to various types of cable or not even to cable at all, will become apparent to those skilled in the art. All such variations and deviations which basically rely on the teachings through which this invention has advanced the art are properly considered to be within the spirit and scope of this invention.

What is claimed is:

1. A fast forming, thermally reversible encapsulating gel composition for filling hydrophone cables consisting essentially of:

from about 2 percent by weight to about 15 percent by weight styrene-ethylene-butene-styrene block copolymers and from about 85 percent by weight to about 98 percent by weight of a naphthenic or paraffinic oil, or solvent where said oil or solvent has an aromatic content of from about 15 percent by weight to about 25 percent by weight.

2. The encapsulating composition of claim 1, wherein said encapsulating composition consists essentially of from about 4 percent by weight to about 8 percent by weight S-EB-S copolymer and from about 92 percent by weight to about 96 percent by weight of said naphthenic or paraffinic oil or solvent.

3. The encapsulating composition of claim 1, wherein said encapsulating composition consists essentially of about 6 percent by weight S-EB-S copolymer, and about 94 percent by weight of said naphthenic or paraffinic oil or solvent, wherein said oil or solvent has an aromatic content of about 15 percent by weight.

4. The encapsulating composition of claim 1, wherein the specific gravity of the composition ranges from about 0.78 for maximum buoyancy to about 0.88 for minimum buoyancy.

* * * * *